United States Patent [19]

Ostermeier

[11] Patent Number: 4,875,751
[45] Date of Patent: Oct. 24, 1989

[54] LOW LOSS PHOTOPLOTTER IMAGING SYSTEM

[75] Inventor: Bruce H. Ostermeier, Fairfield, Calif.

[73] Assignee: AM International Corporation, Chicago, Ill.

[21] Appl. No.: 75,443

[22] Filed: Jul. 20, 1987

[51] Int. Cl.⁴ .............................................. G02B 6/32
[52] U.S. Cl. .............................. 350/96.18; 350/96.24
[58] Field of Search ................ 350/96.1, 96.18, 96.24, 350/96.2

[56] References Cited

U.S. PATENT DOCUMENTS

| | | | |
|---|---|---|---|
| 3,492,058 | 1/1970 | Waldmon | 350/96.18 X |
| 3,584,779 | 6/1971 | Kessler et al. | 350/96.18 X |
| 3,603,665 | 9/1971 | Goldmark et al. | 350/96.24 |
| 3,693,516 | 9/1972 | Aron et al. | 350/96.24 X |
| 3,729,252 | 4/1973 | Nelson | 350/96.24 X |
| 4,511,755 | 4/1985 | Mori | 350/96.24 X |

Primary Examiner—John D. Lee
Assistant Examiner—John Ngo
Attorney, Agent, or Firm—Roy A. Ekstrand; Nicholas A. Camasto

[57] ABSTRACT

A low loss photoplotter imaging system includes a light source having an array of light emitting diodes. A plurality of fiber optic coupling elements are coupled to the LED array and converge to produce a compact high density light source. An aperture plate defining a plurality imaging apertures is interposed between the light source and the medium and is driven by an electric motor to interchange the aperture operative upon the imaging beam. A power zoom lens is utilized to direct and focus the imaging beam upon a photosensitive having a magnification determined in part by the magnification of the zoom lens and close-up lens.

24 Claims, 3 Drawing Sheets

FIG. 5

LOW LOSS PHOTOPLOTTER IMAGING SYSTEM

FIELD OF THE INVENTION

This invention relates generally to image recording upon photosensitive media and particularly to photoplotters.

BACKGROUND OF THE INVENTION

In many manufacturing processes, such as those producing printed circuit boards and integrated circuits, it is necessary to initially produce a film from which the manufactured product is made. Photoplotters provide a means by which such films may be made directly under computer control. In the most common photoplotter configuration, a light source is moved back and forth along a fixed path above a photosensitive media while the media is moved in a second path direction. Generally, the directions of media movement and light source movement are perpendicular to each other. Under the control of the driving computer, the movements of the media and the light source are coordinated to produce latent images upon the photosensitive media. Once the latent images are exposed upon the media, more or less conventional photographic development techniques are utilized in producing the desired positive or negative film.

Because of their capability of producing film directly which is suitable for incorporation in other photographic and photolithographic processes, such as those utilized in fabricating integrated circuits, photoplotters have become an extremely important tool in many manufacturing processes. With the development and availability of computer systems having increased power and capability, the sophistication and capability of the photoplotters has also enjoyed a substantial increase. For example, certain types of photoplotters provide a variable aperture controlling the light source and facilitating the exposure of different sized image lines and objects upon the media.

While the structure of photoplotters varies substantially with designers choice, all generally combine the light source with an optics system generally comprising a plurality of lenses arranged to focus the light provided by the light source upon the media. In some systems, a fixed single aperture is interposed between the light source and the optic system to provide a single image exposing beam size. In other systems, a plurality of apertures are interchangeably supported between the light source and the optic system. In still other types of devices, the aperture is adjustable and mechanical means are provided for carrying out the aperture adjustment. In addition to the foregoing, the majority, if not all, photoplotter systems, utilize a shutter interposed between the light source and the media to permit the complete interruption of image exposing light. This feature is necessary in order to permit movement of the light source with respect to the media in a non-imaging manner between portions of the imaged pattern.

With the continued motivation to improve the photoplotter structures, practitioners in the art have attempted to refine and enhance its performance to take better advantage of the increased power of the computer systems which drive the photoplotter. However, to date, the efforts to refine the photoplotter device have met with only limited success. While several problems arise in optimizing the design of the photoplotter, one of the more serious limitations concerns the light source used to expose the media. In one type of system a flash lamp or strobed light source is used which provides sufficient power buy is subject to prohibitively long recharge times. Conventional incandescent lamps also provide considerable output power but change illumination level slowly in response to changes of applied electrical energy. Similarly, the recently developed Quartz Hallogen lamps provide efficient power sources and more than enough light energy but are similarly limited in their speed of response to changes of illuminating power. As a result, photoplotter systems using such light sources have required the implementation of complex and relatively expensive mechanical devices to provide workable photoplotters. For example, the above-described shutter is not required if the light source operating within the photoplotter may be extinguished quickly once the energy to the light source is cut off. Similarly, it is well within the capability of modern computer systems used to drive photoplotters to improve system imaging by modulating the intensity of the light source in coordination and synchronization with the movement of the photoplotter head an the media. However, once again, because conventional light sources do not respond quickly to changes in applied power, such modulation of light intensity can only be carried out effectively at extremely slow plotter speeds.

Current laser plotters generally modulate the light beam with an acousto-optic modulator or electro-optic modulator controller by electric power. While such lasers provide high speed, the combination of laser and modulator is expensive. In addition, laser systems require polarizers and precise alignment with the laser beam.

There remains therefore, a need in the art for an improved photoplotter imaging system in which the intensity of the light source may be controlled easily and effectively and with sufficient speed to optimize the operation of the photoplotter.

SUMMARY OF THE INVENTION

Accordingly, it is a general object of the present invention to provide an improved photoplotter imaging system. It is a more particular object of the present invention to provide an improved photoplotter imaging system utilizing a light source which may be easily and efficiently controlled and which responds quickly to produce rapid variations or interruptions of light output.

In accordance with the invention there is provided an improved photoplotter imaging system having an array of light emitting diodes cooperating with a plurality of fiber optic couplers to provide a low loss photoplotter imaging system suitable for use in high speed computer driven imaging in which the light output of the LEDs is effectively and efficiently coupled to the medium.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which, like reference numerals identify like elements and in which

DESCRIPTION OF THE PREFERRED EMBODIMENT

Figure 1:
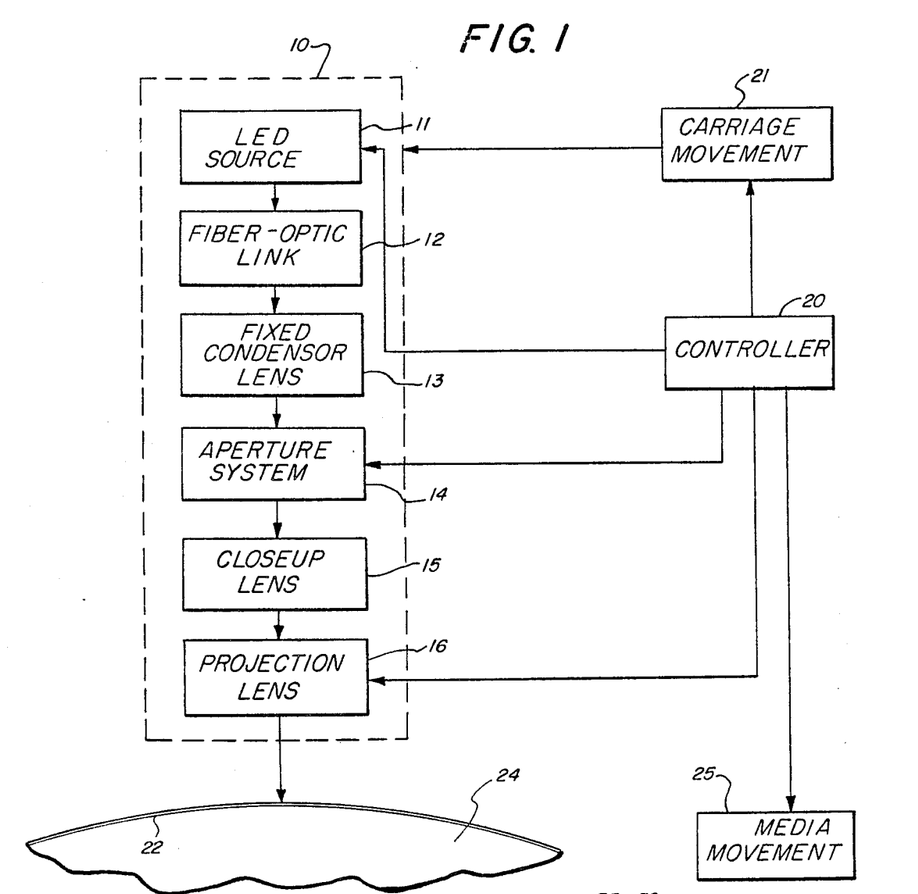
FIG. 1 is a block diagram of a photoplotter imaging system constructed in accordance with the present invention.

FIG. 1 sets forth a block diagram representation of the present invention photoplotter having a moveable light source shown by dash line block 10 which in turn includes a plurality of light emitting diodes (LEDs) supported in an LED array 11, the details of which are set forth below in greater detail. Suffice it to note here however that LED array 11 also includes a plurality of appropriate interconnections to permit the LEDs within LED array 11 to be operated individually or in combinations and at intensity level selected to provide the desired light output from the array The output of LED array 11 is coupled to a fiber optic link 12. As is set forth below in greater detail, fiber optic link 12 includes a plurality of fiber optic filaments and cooperating lenses which couple the light output from the plurality of LEDs within LED array 11 and provide a low loss optical coupling which increases the concentration of illumination produced. A condenser lens 13 which may be constructed in accordance with any of the presently used condenser lens combinations, comprises a fixed focal length lens array having an optical characteristic which converts the incident light on its input side to a parallely directed light output. An aperture system 14 may, in the simplest form, comprise a single opaque element having a single aperture therethrough. Alternatively, aperture system 14 may comprise a variable aperture having a aperture diameter which may be changed to produce light beams of different diameter. In its preferred form, however, aperture system 14 includes a multi-apertured system having means for interchanging apertures to produce a selected size and shaped image on the recording media. A close-up lens 15, which comprises a fixed focal length lens or combination of lenses characterized by a relatively short focal length, receives the output of aperture system 14 and couples it to a projection lens 16. The primary function of projection lens 16 is to focus the light received from close-up lens 15 upon media 22 and to provide a sharply focussed latent image thereon. In its simplest form, projection lens 16 comprises a single fixed focal length lens system. However, in its preferred form, projection lens 16 provides a variable focal length or "zoom" lens together with means for adjusting the lens focal length in response an applied control signal. In accordance with an important advantage of the present invention system and as is set forth below in greater detail, projection lens 16 determines the size of the image produced upon media 22 in accordance with its magnification. As a result, it has been found to be advantageous to utilize an electrically operable or motor driven zoom lens for projection lens 16 in order to dynamically control the degree of magnification of the system and thereby produce the desired image size upon media 22.

A controller 20, provides overall control of the photoplotting process and may in its simplest from include a stored sequence of operating instructions within a dedicated memory. However, in its preferred form controller 20 includes a digital computer having an associated memory within which a stored program set is operable to produce the desired latent image upon media 22. Carriage movement means 21 are electrically coupled to controller 20 and mechanically operable upon light source 10. As is set forth below in greater detail, light source 10 is supported upon a moveable carriage which is caused by carriage movement means 21 to move back and forth along a predetermined path above media 22. A media drum 24 supports media 22 such that motion of drum 24 results in corresponding motion of media 22. A media movement means 25 is coupled to media drum 24 in an operative arrangement which produces the desired linear movement of media 22. Controller 20 is coupled to carriage movement means 21 and media movement means 25 and provides electrical control signals thereto to produce coordinated movements of media 22 and light source 10 in order to etch the desired latent image upon the media.

In operation, LED array 11 is energized by controller 20 to produce an output light beam which is coupled by fiber optic link 12 to fixed condenser lens 13. The cooperation of fiber optic link 12 and condenser lens 13 results in directing and coupling substantially all of the light produced by the LEDs within LED array 11 toward aperture system 14. As mentioned, the light output of fixed condenser lens 13 is imaged entirely within the entrance pupil (aperture) of the close-up lens and is designed to provide optimum energy uniformity at the aperture 14. As is also mentioned above, aperture system 14, in its preferred form, comprises an electromechanical arrangement in which a selected one of a plurality of apertures is interposed between fixed condenser lens 13 and close-up lens 15. Controller 20 is operative to select the appropriate aperture to produce the desired light beam for use in the remainder of the imaging system. It should be noted that the shape of the image upon media 22 is determined entirely by the aperture shape while the size of the image on media 22 is determined entirely by the focal lengths and hence magnification of close-up lens 15 and projection lens 16. The short focal length of close-up lens 15 is operative to collect substantially all of the light transmitted through aperture system 14 and pass it to projection lens 16. Because projection lens 16 is a variable focal length lens, the size of the light beam applied to media 22 and the size of the image formed thereon vary in direct response to adjustment of projection lens 16.

As mentioned, in the preferred form, LED array 11, aperture system 14 and projection lens 16 are electrically adjustable in response to control signals from controller 20. Because the movement produced by carriage movement means 21 of light source 10 and the movement of media 22 produced by media movement means 25 are also under the control of controller 20, the intensity of light beam produced, its shape and size as well as the speed and direction of the light beam motion with respect to the media, may be simultaneously controlled in a coordinated manner by controller 20.

As is well known by practitioners in the art, the speed of operation of a photoplotter for any given photosensitive media is directly controlled or related to the intensity, size, and shape of the light beam used to expose the media. As a result, attempts to increase the speed of plotting in photoplotters are limited by the intensity of light produced by the system. The essential factor in the intensity of light utilized is, in essence, the illumination density of the imaging light. For example, if a given amount of light energy is focussed to a small image beam, the illumination density is increased and the plotting speed may be correspondingly increased. Conversely, in the event that same amount of light energy is focussed to a larger diameter beam to produce a larger image element on the media, the illumination density is reduced and the plotting speed must be correspondingly reduced.

In addition, the quality of image produced during photoplotting is to some extent determined by the degree of control that the controller has over the output of the light source. In the present invention system shown in FIG. 1, LED array 11 provides a light source which is extremely quick to respond to changes in desired light output due to the inherent high speed response of LEDs. In essence, LED array 11 may be operated in a broad range of operating conditions ranging from short bursts or pulses of energy similar to a flashed operation to continuous operation. In addition, during continuous operation, the output from LED array 11 may be dynamically varied or modulated in accordance with the imaging demands of the photoplotter system. For example, as movement between light source 10 and media 22 is initially undertaken, the output produced by LED array 11 is increased slowly in correspondence to the increase in speed of movement to produce substantially uniform intensity of illumination upon the media. Similarly, once the movement between media 22 and light source 10 has reached a constant velocity, the output produced by LED array 11 is held constant to properly expose media 22 at the high rate of imaging speed. Conversely, as the end of a particular imaging path is reached and the movement of light source 10 with respect to media 22 begins to slow down in approaching a stop position, a corresponding decrease in the light output of LED array 11 is also produced to again maintain substantially uniform illumination exposure.

By way of further flexibility, it has been found desirable to provide a short duration burst of light energy at positions which correspond to the edges of the image element. In other words, image definition and sharpness of edges are improved if each start and stop of motion is preceded by a short high energy pulse of illumination. Because of the great flexibility of light output and speed of response of the light emitting diodes within LED array 11, this edge enhancement or pulsing is achievable without additional apparatus in the system.

Finally, because the light emitting diodes in LED array 11 may readily be turned completely off in accordance with the appropriate control signal conditions, the present invention system does not require a mechanical shutter to discontinue the light illumination during transitory motions of the plotting system between imaging intervals.

Figure 2:
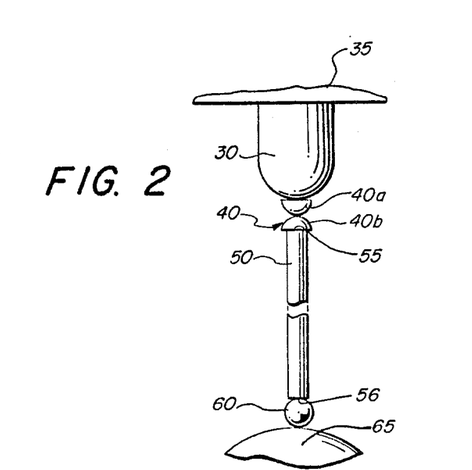
FIG. 2 is a simplified diagram of a portion of the fiber optic link of the present invention photoplotter imaging system

FIG. 2 sets forth a simplified depiction of a single LED and its corresponding fiber optic link. Printed circuit board 35 supports an LED 30 in accordance with conventional electronic component fabrication techniques. It should be understood that appropriate electrical connections within printed circuit board 35 (not shown) provide connections to LED 30 by which electrical power is supplied to LED 30 causing it to produce light. It should be further understood that LED 30 is representative of a generalized form of light emitting diode. However, it will be apparent to those skilled in the art that light emitting diodes having different physical configurations may be substituted for LED 30 and the remaining LEDs in the present invention system without departing from the spirit and scope of the present invention with the essential criteria that the LEDs selected must emit the proper wavelength of light to be able to create the latent image on the media.

Accordingly, in its preferred form, LED 30 comprises a generally cylindrical bulb portion 28 which transitions to a molded aspheric lens portion 29. While fabrication techniques for LEDs vary somewhat, in the preferred form LED bulb 28 and lens 29 are formed of a clear plastic or glass material. A condenser lens 40 comprising a pair of aspheric condenser elements 40a and 40b is supported at the approximate center of lens 29 of LED 30 and is optically coupled thereto. An elongated, generally cylindrical fiber optic filament 50 defines an input end 55 supported in close proximity to and optically coupled to condenser lens 40 and an output end 56. A second spherical lens 60 is supported in close relationship to end 56 of filament 50 and is optically coupled thereto. A condenser lens 65, which may be constructed in accordance with any of the presently known condenser lens fabrications, is optically coupled to and supported in close proximity to spherical lens 60. Light emitting diode 30 further includes an internal light producing element 27 constructed in accordance with conventional LED fabrication techniques. Light producing element 27 approximates a point source of light produced in accordance with the energizing of LED 30. The light produced by element 27 is directed outwardly through bulb 28 via lens 29 to condenser lens 40. The two aspheric condenser elements redirect the radiating light from element 27 and lens 29 into the input end 55 of fiber optic filament 50. In accordance with the fiber optic character of filament 50, the light passing through input end 55 is coupled through filament 50 and emerges at output end 56 having substantially the same character as it possessed at input end 55. In addition, the light emerging at output end 56 is now mixed. That is to say, the essentially point source of light directed into fiber optic filament 50 becomes a uniform diffuse light source having a diameter equal to the fiber core and divergence half angel equal to the inverse Sine of the numeric aperture. The light propagating from output end 56 is collected by a second spherical lens 60 and directed to a condenser lens 65. It should be noted that as used herein the term "optically coupled" is intended to embrace the coupling of light energy between system elements and is not restricted to any specific type of optical communication or light transmission.

As will be apparent to those skilled in the art, the fiber optic link set forth in FIG. 2 permits the coupling of light produced by element 27 to condenser lens 65 without substantial loss of energy. As will also be apparent, the transmitting character of fiber optic links such as filament 50, permits the coupling of light energy through curved or irregular paths. Thus, the light entering input end 55 emerges at output end 56 of filament 50 notwithstanding curvature of filament 50. The importance of this property of fiber optic filaments, such as filament 50, to the present invention will be set forth below. However, suffice it to note here that the coupling property of fiber optic filaments such as filament 50 which accommodates filament curvature permits offset positioning between the LED source (LED 30) and the spherical lens (spherical lens 60). It should be understood by those skilled in the art that the exemplary fiber optic link set forth in FIG. 2 forms an elemental portion of the multiple LED array and fiber optic link of the present invention photoplotter imaging system.

Figure 3:
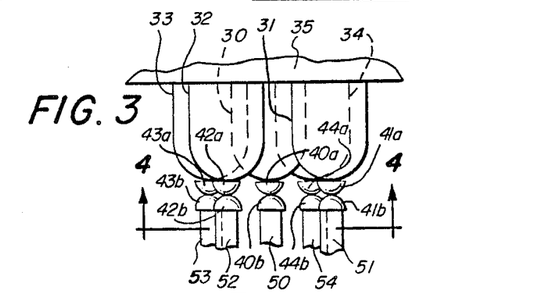
FIG. 3 is a side view of the LED array of the present invention photoplotter imaging system.

FIG. 3 sets forth a partially sectioned view of a portion of LED array 11 in which an array of LEDs 30, 31, 32, 33 and 34 are arranged in a symmetrical pattern. In accordance with conventional fabrication techniques, LEDs 30 through 34 are supported upon printed circuit board 35 such that appropriate electrical connections are made between the active elements within LEDs 30 through 34 and their energizing circuitry (not shown). A plurality of condenser lenses 40, 41, 42, 43 and 44 are supported in close proximity to LEDs 30 through 34 respectively in an arrangement similar to that shown for LED 30 and condenser lens 40 in FIG. 2. Each comprise pairs of aspheric elements as shown for condenser lens 40. Thus, lenses 40 through 44 are formed of elements 40a and 40b through 44a and 44b respectively. In further similarity to FIG. 2, a plurality of fiber optic filaments 50, 51, 52, 53 and 54 are supported in close proximity to spherical lenses 40 through 44 respectively in accordance with the arrangement shown in FIG. 2.

Figure 4:
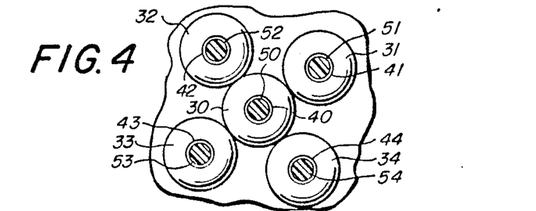
FIG. 4 is a section view of the LED array of the present invention photoplotter imaging system taken along section lines 4—4 in FIG. 3.

FIG. 4 sets forth a section view of the LED lens and fiber optic coupling shown in FIG. 3 taken along section lines 4—4 therein. As can be seen, LED 30 forms the central element in a generally symmetrical arrangement of LEDs 31 through 34 surrounding LED 30. It should also be noted that while LEDs 30 through 34 are arranged close together in the embodiment shown, the spacing between the LEDs may, in accordance with an important aspect of the present invention, be separated and nonsymmetrical and still provide a generally uniform illumination pattern upon media 22.

Figure 5:
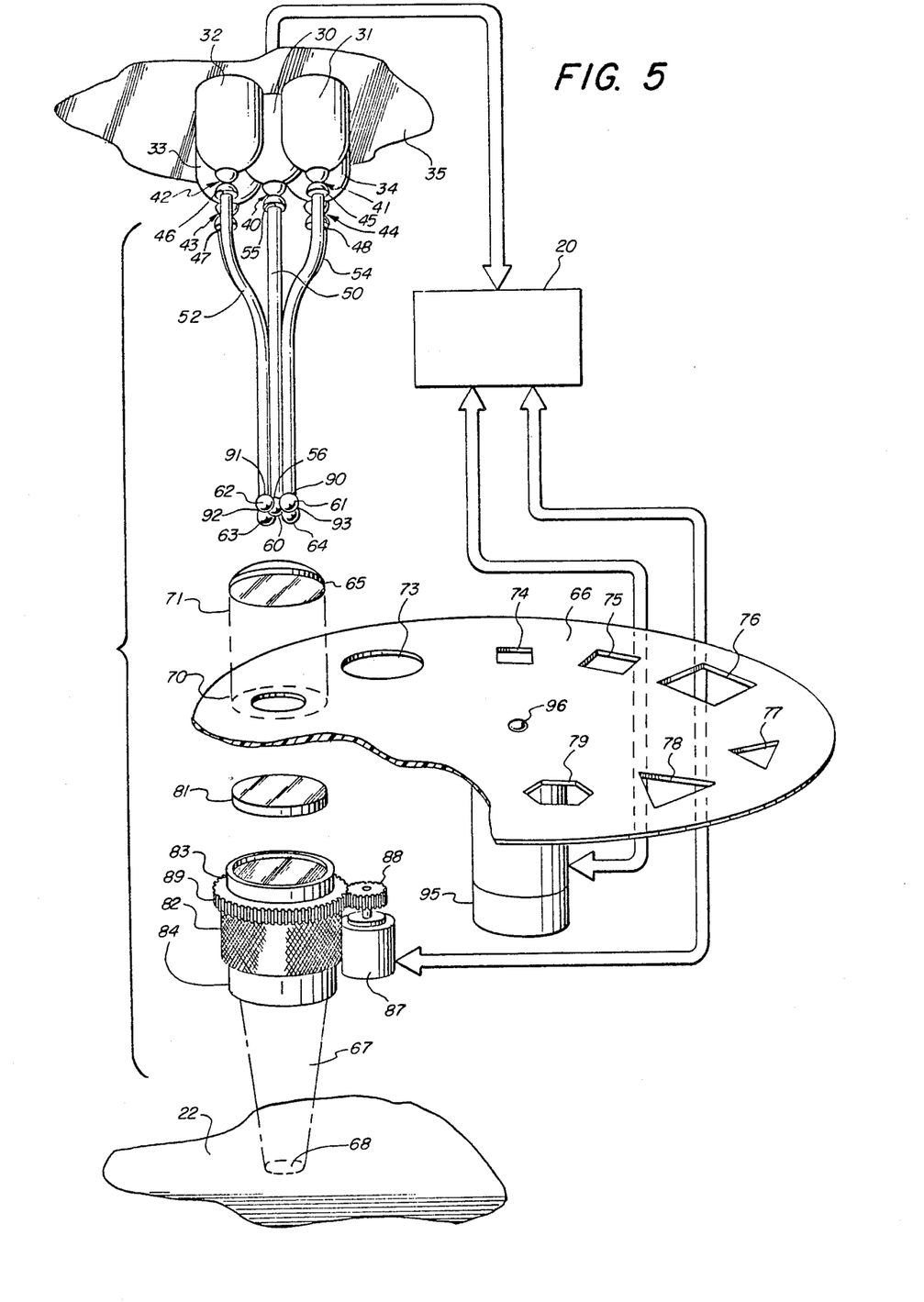
FIG. 5 is a perspective view of a portion of the present invention photoplotter imaging system.

FIG. 5 sets forth a perspective view of a portion of the present invention photoplotter imaging system in which printed circuit board 35 supports LEDs 30 through 34 in the symmetrical arrangement set forth in FIGS. 3 and 4. Condenser lenses 40 through 44 are supported with respect to LEDs 30 through 34 in accordance with the arrangement shown in FIGS. 3 and 4. A plurality of fiber optic filaments 50, 51, 52, 53 and 54 define respective input ends 55, 45, 46, 47 and 48 and respective output ends 56, 90, 91, 92 and 93. In accordance with the arrangement set forth in FIG. 2, fiber optic filament 50 has its input 55 in close proximity to condenser lens 40 and its output end 56 in close proximity to spherical lens 60. In further similarity to FIG. 2, fiber optic filament 50 is substantially straight and defines the center fiber optic element in the arrangement of fiber optic filaments 50 through 54. Fiber optic filament 51 has its input end 45 supported in close proximity to condenser lens 41 and its output end 90 supported in close proximity to a spherical lens 61. Similarly, fiber optic filament 52 has its input end 46 supported in close proximity to condenser lens 42 and its output end 91 supported in close proximity to spherical lens 62. Fiber optic filament 53 is similar in that its input end 47 is supported in close proximity to condenser lens 43 and its output end is supported in close proximity to a spherical lens 63. Fiber optic filament 54 has its input end supported in close proximity to condenser lens 44 and its output end 93 supported in close proximity to spherical lens 64.

It should be noted by examination of FIG. 5 that with the exception of center fiber optic filament 50, the remaining fiber optic filaments generally converge toward fiber optic filament 50 and produce a more compact arrangement at their respective output ends than is achieved at their respective input ends. In other words, due to the physical spacing between LEDs 30 through 34, fiber optic filaments 51 through 54 are spaced apart at their input ends with respect to fiber optic filament 50. However, at the output ends, the filaments are brought into a closer arrangement which is geometrically similar in its symmetry to the arrangement of LEDs 230 through 34 but which is more closely spaced due to the smaller diameters of fiber optic filaments 50 through 54 and spherical lenses 60 through 64. As a result, and in accordance with an important aspect of the present invention, the light source produced at spherical lenses 60 through 64 is substantially compacted or intensified, in terms of light energy per unit area, than it would be by direct use of LEDs 30 through 34 without the fiber optic coupling of the present invention system. Therefore, the present invention fiber optic coupling, due to its ability to efficiently couple light energy through curved paths, permits a converging coupling from the more broadly spaced LEDs to the more closely spaced spherical lenses at the output ends of fiber optic filaments 50 through 54. In addition, it will be apparent to those skilled in the art that the present invention system permits virtually any arrangement of LEDs 30 through 34 to be coupled to the compact arrangement of spherical lenses 60 through 64 due to the curved coupling of fiber optic filaments 50 through 54. Accordingly, LEDs 30 through 34 may be offset from spherical lenses 60 through 64, or arranged in a straight line or other configuration.

A condenser lens 65 receives the output from spherical lenses 60 through 64 and directs the light through the aperture into the close-up lens entrance pupil. An aperture plate 66, the details of which are set forth below in greater detail, defines a plurality of apertures such as aperture 70. Aperture 70 defines a circular cross-section and is representative of a selected one of the apertures set forth below on aperture plate 66. As will be explained below in greater detail, aperture plate 66 is rotated to bring a selected aperture (in this case aperture 70) into alignment with condenser lens 65 and thus establish the size and shape of the imaging light beam. A close-up lens 81 which, in its preferred form, comprises a fixed focal length lens having a close-up or magnifying property receives the portion of the imaging light beam passing through aperture 70. A projection lens 82 which, as mentioned above, defines a variable focal length or zoom-type projection lens, receives the light transmitted through close-up lens 81 and focuses it upon media 22 to form an image spot 85. It should be noted that the shape of image spot 85 corresponds to the shape of aperture 70. However, the size of image spot 85 is determined in part by the action of projection lens 82. The system magnification is defined by the ratio of the focal length of projection lens to the focal length of close-up lens.

In operation, the light produced by LEDs 30 through 34 is coupled by condenser lenses 40 through 44 respectively and fiber optic filaments 50 through 54 and spherical lenses 60 through 64 to condenser lens 65 in a manner whereby substantially all of the light output of LEDs 30 through 34 is concentrated in a smaller area pattern upon condenser lens 65 due to the converging character of the present invention fiber optic link. The output light from spherical lenses 60 through 64 and condenser lens 65 illuminates a portion of aperture plate 66. The portion of incident light upon aperture plate 66 not passing through aperture 70 is absorbed by aperture plate 66. As a result, the portion of imaging light transmitted by condenser lens 65, which passes through aperture 70, assumes the cross-sectional shape and size at that point of aperture 70. Thereafter, the light passing through aperture 70 is further intensified or focused to a smaller beam size by the magnification ratio of the close-up lens 81 and projection lens 82. Through the action of projection lens 82, the light received from close-up lens 81 is magnified and focused upon media 22 to produce image spot 85. It will be apparent to those skilled in the art that several substantial advantages are realized by the combination set forth in FIG. 5 which improve the imaging capability of the present invention system. For example, the converging structure of fiber optic link 12 permits the use of multiple LED light sources notwithstanding their limited illumination density resulting from the size of LEDs 30 through 34. As mentioned above, the use of LED light sources rather than conventional incandescent or Quartz Hallogen lamps as illumination sources provides substantial advantage in the flexibility and sophistication of the photoplotter operation. As a result of the structure used, a substantial increase in the density of illumination within the imaging beam is achieved while still realizing the other advantages, such as fast response time and easy cut-off or extinguishment, provided by LED light sources. With respect to aperture plate 66, the advantages of providing a multi-apertured system in which a plurality of apertures may be interchangeably placed within the imaging beam provides a variety of aperture shapes and sizes and permits the use of specialized apertures such as registration indexing marks or character identifiers. The use of projection lens 82 provides the degree of magnification of the imaging system and maintains focus of the image spot upon the photosensitive media. As mentioned, the use of a zoom-type variable focal length lens for projection lens 82 permits the degree of magnification to be adjusted over a substantial range while still maintaining focus of the imaging light beam upon the media. In addition, because the shape of the imaging light beam is determined for the most part by the shape of the selected aperture within aperture plate 66 (such as aperture 70), and because the close-up lens 81 and projection lens 82 affects only the degree of magnification of the imaging beam passing through it, the shape of imaging spot 85 is maintained at different magnifications. As a result, image elements at different sizes may be produced from a single aperture.

Figure 6:
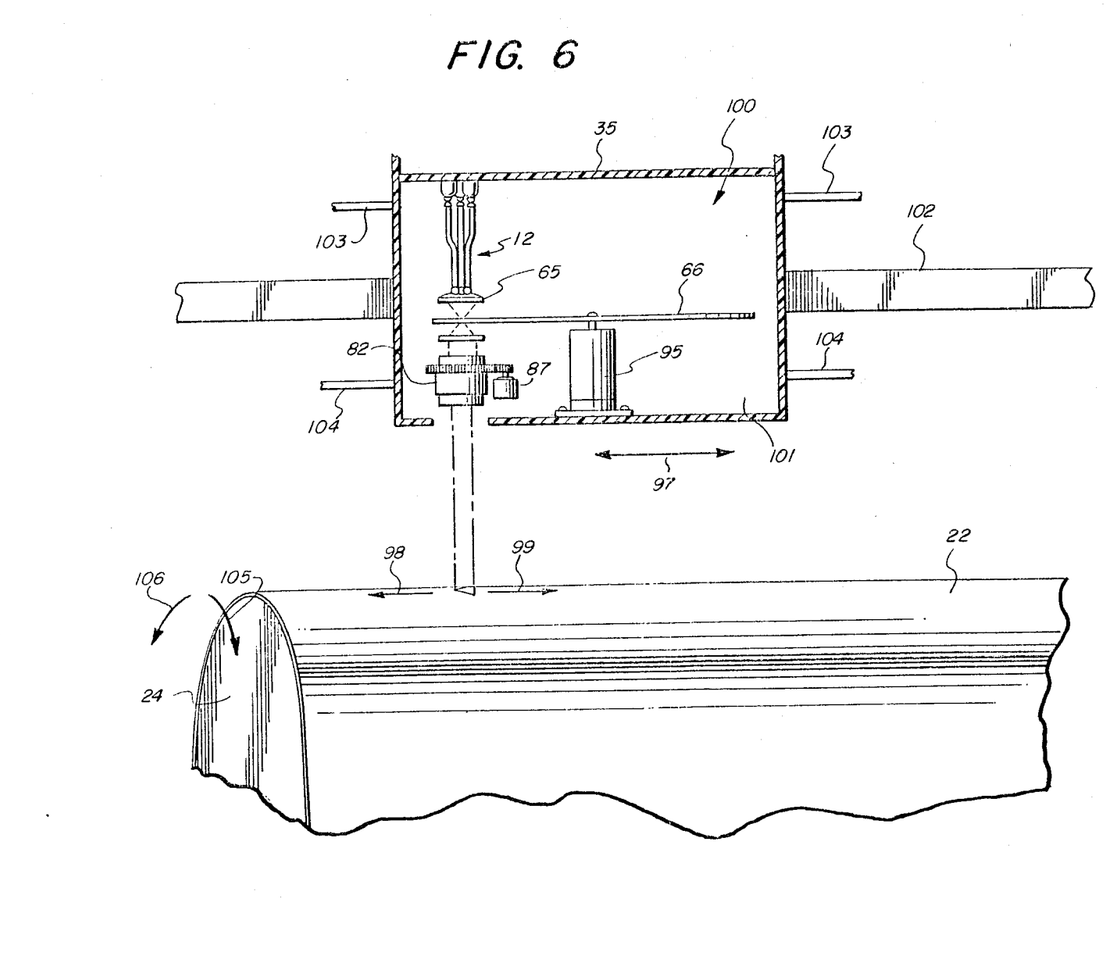
FIG. 6 is a perspective view of the present invention photoplotter imaging system.

FIG. 6 sets forth a perspective view of a portion of the present invention photoplotter imaging system in which a printed circuit board 35 supports a plurality of LEDs 30 through 34 which in turn are coupled to a plurality of fiber optic filaments 50 through 54. The structure of LEDs 30 through 34 and fiber optic filaments 50 through 54 is substantially the same as that set forth in FIG. 5. A condenser lens 65 is supported in alignment with the output of fiber optic filaments 50 through 54 of fiber optic link 12. An aperture plate 66 comprises a generally planar circular member having a center coupling 96 and defining a plurality of apertures 70 through 80 spaced about the perimeter of plate 66. A conventional drive motor 95 engages aperture plate 66 at coupling 96 in accordance with conventional fabrication techniques such that rotation of the armature of motor 95 (not shown) produces a corresponding rotation of aperture plate 66. A close-up lens 81 is supported beneath aperture plate 66 and is substantially in alignment with the output of fiber optic link 12, condenser lens 65 and LEDs 30 through 34. As mentioned above, close-up lens 81 is a fixed focal length lens having a relatively short focal length. A projection lens 82 substantially identical to that set forth in FIG. 5, comprises a first portion 83 and a second portion 84 which, in accordance with conventional zoom lens fabrication techniques, are rotatable and moveable with respect to each other to vary the focal length of projection lens 82. A conventional drive motor 87 is supported in close proximity to projection lens 82 and supports a zoom lens drive 88. Element 83 of projection lens 82 supports a gear ring 89 which is secured to the surface of element 83 and engages zoom lens drive 88. In accordance with conventional motorized zoom lens construction, motor 87, zoom lens drive 88 and gear ring 89 cooperate to rotate element 83 with respect to element 84 of projection lens 82 to vary the focal length of projection lens 82. While any number of conventional motor driven zoom lenses may be used for projection lens 82, it has been found to be advantageous to use a conventional power zoom lens of the type used on video cameras. A photosensitive media 22 is supported beneath projection lens 82. A controller 20 is operatively coupled to printed circuit board 35, motor 95 and motor 87 to operate LEDs s 30 through 34, aperture plate 66 and projection lens 82 to produce the desired imaging beam for use upon media 22.

In accordance with the operation described in conjunction with FIG. 5, controller 20 energizes one or more of LEDs 30 through 34 to produce the desired output light required by the imaging system. The light produced by LEDs 30 through 34 is effectively concentrated and coupled by fiber optic filaments 50 through 54 and transmitted by condenser lens 65 to illuminate aperture plate 66. As also mentioned above, the imaging beam produced by LEDs 30 through 34 and coupled by fiber optic link 12 and condenser lens 65 illuminates a small region around the outside portion of aperture 70 as shown by dashed line 57. As a result, a portion of the imaging light is absorbed by aperture plate 66. The remaining portion passes through aperture 70, close-up lens 81 and zoom projection lens 82. With the operation of motor 87 under the control of controller 20, the appropriate focal length of lens 82 is selected by rotating element 83 with respect to element 84 of projection lens 82 to produce the desired image spot 68 on media 22.

In accordance with an important aspect of the present invention, the output light level produced by LEDs 30 through 34 may be controlled within a certain range by controlling the electrical power applied to LEDs 30 through 34. In addition, substantial changes in light output level may be affected by energizing different combinations of LEDs 30 through 34. For example, the lowest light output levels are produced by energizing only center LED 30 while the maximum output level is produced by energizing all of LEDs 30 through 34. Intermediate steps of illumination power may of course by produced by illuminating intermediate combinations of LEDs 30 through 34. However, it has been found that optimum illumination is obtained by energizing all LEDs with varied intensity to produce a more uniform distribution of light energy.

It will be apparent to those skilled in the art that while an arrangement of five LEDs are shown and described, virtually any number of LEDs may be used without departing from the spirit and scope of the present invention. It should also be noted that while fiber optic filaments 50 through 54 are shown as single filaments, they may be replaced by multiple groups of filaments without departing from the spirit and scope of the present invention.

FIG. 6 sets forth the present invention photoplotter imaging system in a typical arrangement in which a carriage 100 which defines a generally planar member having a support face 101 is positioned above media 22. Media 22 is supported by a media drive roller 24 which should be understood to be coupled to media movement means 25 (not shown). A carriage band 102 which comprises a flat ribbon-like continuous band is secured to carriage 100 and is coupled to conventional carriage drive means (not shown) which provide in accordance with conventional photo plotter device construction means for moving carriage 100 back and forth in the directions shown by arrows 97. A pair of conventional support rails 103 and 104 supported in accordance with conventional photoplotter fabrication techniques are coupled to carriage 100 by means not shown such that carriage is freely moveable upon rails 103 and 104 in the directions of arrows 97 under the control of carriage band 102.

The light source structure set forth in FIG. 6 supported upon support face 101 of carriage 100 should be understood to comprise the photoplotter imaging system set forth in the foregoing figures. Accordingly, surface 101 supports printed circuit board 35 which in turn supports LED array 11 extending downwardly therefrom. Fiber optic link 12 is interposed between LED array 11 and condenser lens 65. Aperture plate 66 and drive motor 95 are supported beneath condenser lens 65 while close u lens 81 is positioned directly beneath condenser lens 65 and supported with respect to support face 101. Projection lens 82 including projection lens drive motor 87 are supported upon support face 101 in alignment with condenser lens 65 and close up lens 81. By means described above the light output of LED array 11 is coupled through condenser lens 75, a selected aperture within aperture plate 66, close up lens 81, and projection lens 82 to media 22 forming thereon an imaging spot 68. In accordance with conventional photoplotter operation, media drive drum 24 move media 22 with respect to the travel path of carriage 100 indicated by arrows 97 such that a relative motion of imaging spot 68 in the direction of arrows 105 and 106 is produced. Conversely, movement of carriage 100 in the carriage path indicated by arrows 97 results in relative movement of imaging spot 68 with respect to media 22 in the directions indicated by arrows 98 and 99. In accordance with conventional photoplotter operation the movement of carriage 100 and the movements of media 22 are carried out to move imaging spot 68 about media 22 to produce the above-described photographic imaging which produces a latent image upon media 22 in accordance with the desired pattern.

While the movement of carriage 100 and media 22 referred to above is substantially in accordance with conventional photoplotter operation it will be apparent to those skilled in the art in view of the foregoing material that several advantages of the present invention structure which greatly increase the effectiveness and capability of photoplotters have been shown. The ease with which LED array 11 may be controlled to produce a wide variety of illumination levels together with the fast response of the LED array produce an imaging light source which approaches the ideal performance. Fiber optic link 12 overcomes the previous problems of low output and low illumination density by effectively converging or concentrating the imaging light produced by LED array 11.

As a result, the combination of LED array 11 and fiber optic link 12 cooperate to produce a nearly ideal imaging light source with more than sufficient power and quick response to permit higher photoplotting speeds. The use of multiple aperture plate 66 in combination with this improved imaging light source permits the rapid shaping of the image without substantial loss of or interruption of plotter operation. In addition, the use of LEDs within the light source avoids the necessity of providing a mechanical shutter to extinguish imaging spot 68 and permit movement of media 22 and carriage 100 in a non-imaging mode. In addition, LED array 11 may be operated in a pulsed or flash mode by simply configuring the applied power to the LED array accordingly. No other changes in the system are required.

Finally, the use of projection lens 82 in its preferred form of a powered zoom lens permits the image size to be varied quickly and effectively resulting in fewer instances in which the imaging process requires multiple passes to expose large areas. In the present invention system the exposure of large areas is accomplished by simply selecting the appropriate aperture from aperture plate 66, increasing the magnification of projection lens 82 and coordinating the motions speed of carriage 100 with respect to media 22.

What has been shown is an improved photoplotter imaging system which utilizes a novel light source having the capability to be quickly, easily and efficiently controlled and which responds to produce rapid variations or interruptions of light output as well as an increased range of image size capabilities.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention That which is claimed is:

1. For use in a photoplotter in which a source of imaging light beam is supported upon a movable carriage and is directed to a photosensitive media to expose a latent image thereon, an imaging system operative without a shutter mechanism providing a light beam having rapid rise and fall times relative to carriage motion, said imaging system comprising:
    a plurality of light emitting diodes each capable of producing a light output turned on and off solely by applied electrical signals;
    a fiber-optic link having a first end optically coupled to said plurality of light emitting diodes and a second end;
    lens means optically coupled to said second end of said fiber optic link; and
    aperture means, interposed between said second end of said fiber optic link and said lens means, including an opaque member defining a light transparent aperture.

2. An imaging system as set forth in claim 1 wherein said plurality of light emitting diodes are arranged in a predetermined pattern defining a first spacing therebetween and wherein said fiber optic link includes a plurality of fiber optic elements having input ends in optically coupled to selected ones of said plurality of light emitting diodes and output ends arranged in a predetermined pattern defining a second spacing therebetween smaller than said first spacing.

3. An imaging system as set forth in claim 2 wherein each of said fiber optic elements is formed in a single fiber optic filament.

4. An imaging system as set forth in claim 3 wherein said fiber optic link includes:
a first plurality of spherical lenses interposed between said first ends of said fiber optic elements and said light emitting diodes; an
a second plurality of spherical lenses interposed between said second ends of said fiber optic elements and said aperture means.

5. An imaging system as set forth in claim 4 wherein said predetermined pattern of light emitting diodes includes a center light emitting diode with surrounding light emitting diodes arranged symmetrically about the center light emitting diode 6. An imaging system as set forth in claim 5 wherein said lens means include a variable focal length projection lens.

7. An imaging system as set forth in claim 6 wherein said aperture means includes:
an opaque planar member defining a plurality of light transmitting apertures; and
change means for moving said opaque planar member to align a selected one of said plurality of light transmitting apertures with said lens means.

8. An imaging system as set forth in claim 7 wherein said opaque planar member is circular and said plurality of light transmitting apertures are disposed on a common circle thereof and wherein said change means are operative to rotate said opaque planar member.

9. An imaging system as set forth in claim 3 wherein said fiber optic link includes:
a first plurality of condenser lenses each having a pair of aspheric elements interposed between said first ends of said fiber optic elements and said light emitting diodes; and
a second plurality of spherical lenses interposed between said second ends of said fiber optic elements and said aperture means.

10. An imaging system as set forth in claim 9 wherein said predetermined pattern of light emitting diodes includes a center light emitting diode with surrounding light emitting diodes arranged symmetrically about the center light emitting diode.

11. An imaging system as set forth in claim 10 wherein said lens means include a variable focal length projection lens.

12. An imaging system as set forth in claim 11 wherein said aperture means includes:
an opaque planar member defining a plurality of light transmitting apertures; and
change means for moving said opaque planar member to align a selected one of said plurality of light transmitting apertures with said lens means.

13. An imaging system as set forth in claim 12 wherein said opaque planar member is circular and said plurality of light transmitting apertures are disposed on a common circle thereof and wherein said change means are operative to rotate said opaque planar member.

14. An imaging system as set forth in claim 3 wherein said plurality of light emitting diodes each include an integral lens each coupled to a respective one of said first ends of said fiber optic filaments and wherein said fiber optic link includes:
a plurality of spherical lenses interposed between said second ends of said fiber optic elements and said aperture means.

15. An imaging system as set forth in claim 14 wherein said predetermined pattern of light emitting diodes includes a center light emitting diode with surrounding light emitting diodes arranged symmetrically about the center light emitting diode.

16. An imaging system as set forth in claim 15 wherein said lens means include a variable focal length projection lens.

17. An imaging system as set forth in claim 16 wherein said aperture means includes:
an opaque planar member defining a plurality of light transmitting apertures; and
change means for moving said opaque planar member to align a selected one of said plurality of light transmitting apertures with said lens means.

18. An imaging system as set forth in claim 17 wherein said opaque planar member is circular and said plurality of light transmitting apertures are disposed on a common circle thereof and wherein said change means are operative to rotate said opaque planar member.

19. For use in a photoplotter in which an imaging beam of light is directed to a photosensitive media to expose a latent image thereon, an imaging system comprising:
a plurality of light emitting diodes each producing a light output and defining a light transmitting surface through which light produced is outwardly directed;
a first plurality of spherical lenses in optical communication with said light transmitting surfaces;
a plurality of fiber optic filaments each having a first end optically communicating with a respective one of said first plurality of spherical lenses and a second end;
a second plurality of spherical lenses in optical communication with said second ends of said fiber optic filaments;
a condenser lens in optical communication with said second plurality of spherical lenses;
a close-up lens in optical communication with said condenser lens;
aperture means interposed between said condenser lens and said close-up lens and having an opaque planar member defining a plurality of light transmitting apertures and having means for aligning a selected one of said light transmitting apertures between said condenser lens and said close-up lens; and
a variable focal length lens in optically coupled with said close-up lens operative to focus the light received from said close-up lens upon said media.

20. An imaging system as set forth in claim 19 wherein said plurality of light emitting diodes are arrange in a symmetrical pattern in which a center light emitting diode is surrounded by the remainder of the light emitting diodes within said plurality of light emitting diodes.

21. An imaging system as set forth in claim 20 wherein second plurality of spherical lenses are arranged in pattern corresponding to that of said light emitting diodes and wherein the spacing between said light emitting diodes is greater than the spacing between said second plurality of spherical lenses and said plurality of fiber optic filaments converge in extending from said first plurality of lenses to the second plurality of spherical lenses.

22. For use in a photoplotter of the type in which a moveable imaging light beam is shaped by an aperture system and is magnified and directed toward a photosensitive media to produce a latent image thereon, an imaging light source operative without a shutter mechanism providing a light beam having rapid rise and fall times relative to carriage motion, said imaging light source comprising:

a plurality of light emitting diodes arranged to produce a plurality of light sources turned on and off solely by applied electrical signals arranged in a predetermined pattern and having a first spacing therebetween;

a fiber optic link, optically coupled to said light emitting diodes, defining a converging optical coupler producing an output in which the light outputs from said plurality of light sources are arranged in said predetermined pattern having a second reduced spacing therebetween.

23. An imaging light source as set forth in claim 22 wherein said predetermined pattern of light sources includes a center light source and symmetrical arrangement of surrounding light sources.

24. An imaging light source as set forth in claim 23 wherein said fiber optic link includes a plurality of fiber optic filaments each having an input end coupled to one of said light emitting diodes and an output end, said output ends arranged in the same pattern as said predetermined pattern.

* * * * *